US008316828B2

(12) United States Patent
Whitney et al.

(10) Patent No.: US 8,316,828 B2
(45) Date of Patent: Nov. 27, 2012

(54) EXHAUST GAS RECIRCULATION DIAGNOSTIC FOR COORDINATED TORQUE CONTROL SYSTEMS

(75) Inventors: Christopher E. Whitney, Highland, MI (US); Gregory J. York, Fenton, MI (US); Jeffrey M. Kaiser, Highland, MI (US); Katie C. Bonasse, Linden, MI (US)

(73) Assignee: GM Global Technology Operations LLC

(*) Notice: Subject to any disclaimer, the term of this patent is extended or adjusted under 35 U.S.C. 154(b) by 303 days.

(21) Appl. No.: 12/652,301

(22) Filed: Jan. 5, 2010

(65) Prior Publication Data

US 2010/0263627 A1 Oct. 21, 2010

Related U.S. Application Data

(60) Provisional application No. 61/170,347, filed on Apr. 17, 2009.

(51) Int. Cl.

| | |
|---|---|
| ***F02B 47/08*** | (2006.01) |
| ***F02M 25/07*** | (2006.01) |
| ***B60T 7/12*** | (2006.01) |
| ***G05D 1/00*** | (2006.01) |
| ***G06F 7/00*** | (2006.01) |
| ***G06F 17/00*** | (2006.01) |

(52) U.S. Cl. .................................. 123/568.16; 701/108

(58) Field of Classification Search .................. 123/399, 123/568.16, 568.21, 198 D; 701/108; 73/114.74, 73/188

See application file for complete search history.

(56) References Cited

U.S. PATENT DOCUMENTS

| | | | | |
|---|---|---|---|---|
| 5,154,156 | A * | 10/1992 | Ohuchi | 123/568.16 |
| 5,212,947 | A | 5/1993 | Fujimoto et al. | |
| 5,337,725 | A * | 8/1994 | Narita | 123/568.16 |
| 5,368,005 | A * | 11/1994 | Kako | 123/568.16 |
| 5,488,938 | A * | 2/1996 | Ohuchi | 123/568.16 |
| 5,513,616 | A * | 5/1996 | Matsumoto et al. | 123/568.16 |
| 5,653,212 | A * | 8/1997 | Hotta et al. | 123/568.16 |
| 5,675,080 | A * | 10/1997 | Wada | 73/114.74 |
| 5,964,820 | A * | 10/1999 | Miwa et al. | 701/108 |
| 6,763,708 | B2 * | 7/2004 | Ting et al. | 73/114.74 |
| 6,904,792 | B2 * | 6/2005 | Wakahara | 73/114.39 |
| 6,920,751 | B2 | 7/2005 | Yasui et al. | |
| 7,103,467 | B2 | 9/2006 | Takahashi et al. | |
| 7,201,160 | B2 | 4/2007 | Yoshiume et al. | |
| 7,248,960 | B2 | 7/2007 | Ikemoto et al. | |
| 7,275,525 | B2 * | 10/2007 | Miyasako et al. | 123/568.16 |
| 7,387,011 | B2 | 6/2008 | Fujiki et al. | |
| 7,565,901 | B2 * | 7/2009 | Furuta et al. | 123/568.16 |
| 7,779,669 | B2 | 8/2010 | Fukagai et al. | |
| 7,954,364 | B2 | 6/2011 | Shoda | |

* cited by examiner

*Primary Examiner* — Stephen K Cronin
*Assistant Examiner* — Sherman Manley

(57) ABSTRACT

A control system includes a throttle control module, an exhaust gas recirculation (EGR) control module, and a diagnostic control module. The throttle control module selectively maintains a desired throttle area when a vehicle is in a coastdown mode. The EGR control module opens an EGR valve when the desired throttle area is maintained. The diagnostic control module selectively diagnoses an error of an EGR system based on a pressure increase measured in an intake manifold of the vehicle when the EGR valve is open.

20 Claims, 5 Drawing Sheets

EXHAUST GAS RECIRCULATION DIAGNOSTIC FOR COORDINATED TORQUE CONTROL SYSTEMS

CROSS-REFERENCE TO RELATED APPLICATIONS

This application claims the benefit of U.S. Provisional Application No. 61/170,347, filed on Apr. 17, 2009. The disclosure of the above application is incorporated herein by reference in its entirety.

FIELD

The present invention relates to exhaust gas recirculation (EGR) systems for internal combustion engines, and more particularly an EGR diagnostic system and method for a coordinated torque control (CTC) system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts a throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

Exhaust gases exit the engine through an exhaust manifold and are treated by an exhaust system. Engine systems often include an exhaust gas recirculation (EGR) system to reduce emissions. EGR systems return the exhaust gases to an intake manifold to be drawn into the cylinders. The exhaust gases contain unburned fuel. Oxygen levels in the exhaust gases are lower than oxygen levels in the air/fuel mixture before combustion.

Returning the exhaust gases to the cylinders tends to limit the amount of oxygen available for combustion and increase the manifold air pressure. Limiting the oxygen available for combustion lowers combustion temperatures and reduces emissions. Increasing the manifold air pressure reduces pumping losses of the engine, thereby improving fuel economy.

Debris build-up within the EGR system restricts the flow of exhaust and minimizes the effectiveness of the EGR system. Thus, an EGR diagnostic test may be performed to determine when the EGR flow is restricted. The EGR diagnostic test may include opening an EGR valve to increase the EGR flow and monitoring pressure levels in the intake manifold.

SUMMARY

A control system includes a throttle control module, an exhaust gas recirculation (EGR) control module, and a diagnostic control module. The throttle control module selectively maintains a desired throttle area when a vehicle is in a coastdown mode. The EGR control module opens an EGR valve when the desired throttle area is maintained. The diagnostic control module selectively diagnoses an error of an EGR system based on a pressure increase measured in an intake manifold of the vehicle when the EGR valve is open.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
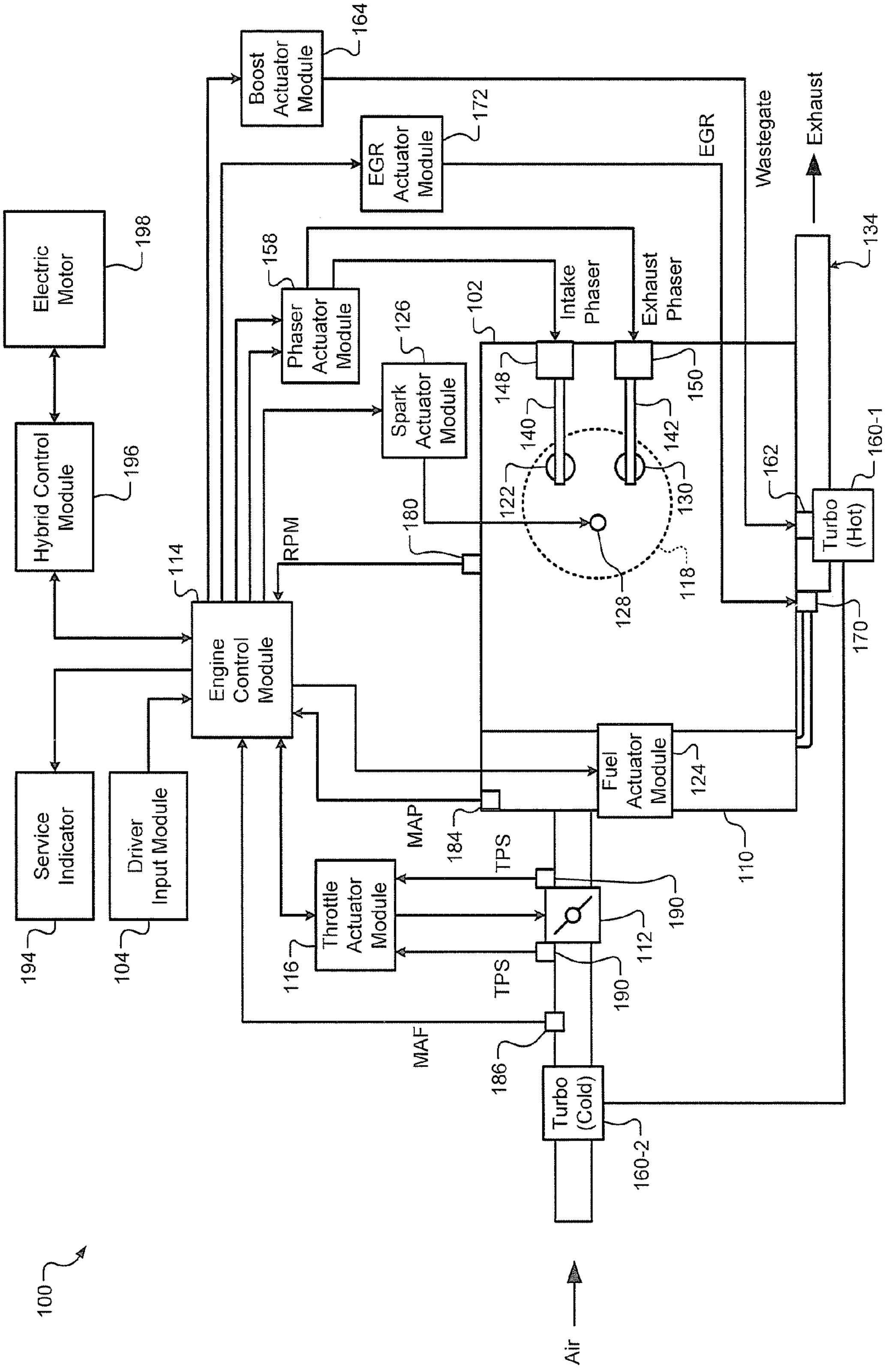
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An exhaust gas recirculation (EGR) diagnostic system and method of the present disclosure may maintain or fix a desired throttle area when a vehicle is operating in a coastdown mode, open an EGR valve when the desired throttle area is maintained, and diagnose an error of an EGR system based on a pressure increase measured in an intake manifold when the EGR valve is open. An error of the EGR system may be diagnosed when the measured pressure increase is less than a minimum pressure increase.

A coordinated torque control (CTC) system may adjust a desired throttle area based on a position of the EGR valve.

Opening the EGR valve when the desired throttle area is fixed prevents the CTC system from opening the throttle when the EGR valve is opened. This ensures that the measured pressure increase is due to the EGR valve opening rather than the throttle opening. In turn, the measured pressure increase may be used to diagnose an error of the EGR system in a vehicle that includes the CTC system.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172. The EGR valve 170 and the EGR actuator module 172 may be referred to as an EGR system, which may also include components that deliver exhaust gas from the EGR valve 170 to the intake manifold 110.

The engine system 100 may measure the speed of the crankshaft in revolutions per minute (RPM) using an RPM sensor 180. The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor a position of the throttle valve 112 and/or a throttle area using one or more throttle position sensors (TPS) 190. The ECM 114 may use signals from the sensors to control the engine system 100. The ECM 114 may execute EGR diagnostic techniques of the present disclosure, which may include activating a service indicator 194.

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114 and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, and the fuel actuator module 124. For these actuators, the actuator values may correspond to boost pressure, EGR valve opening area, intake and exhaust cam phaser angles, and fueling rate, respectively. The ECM 114 may control actuator values in order to generate a desired torque from the engine 102.

Figure 2:
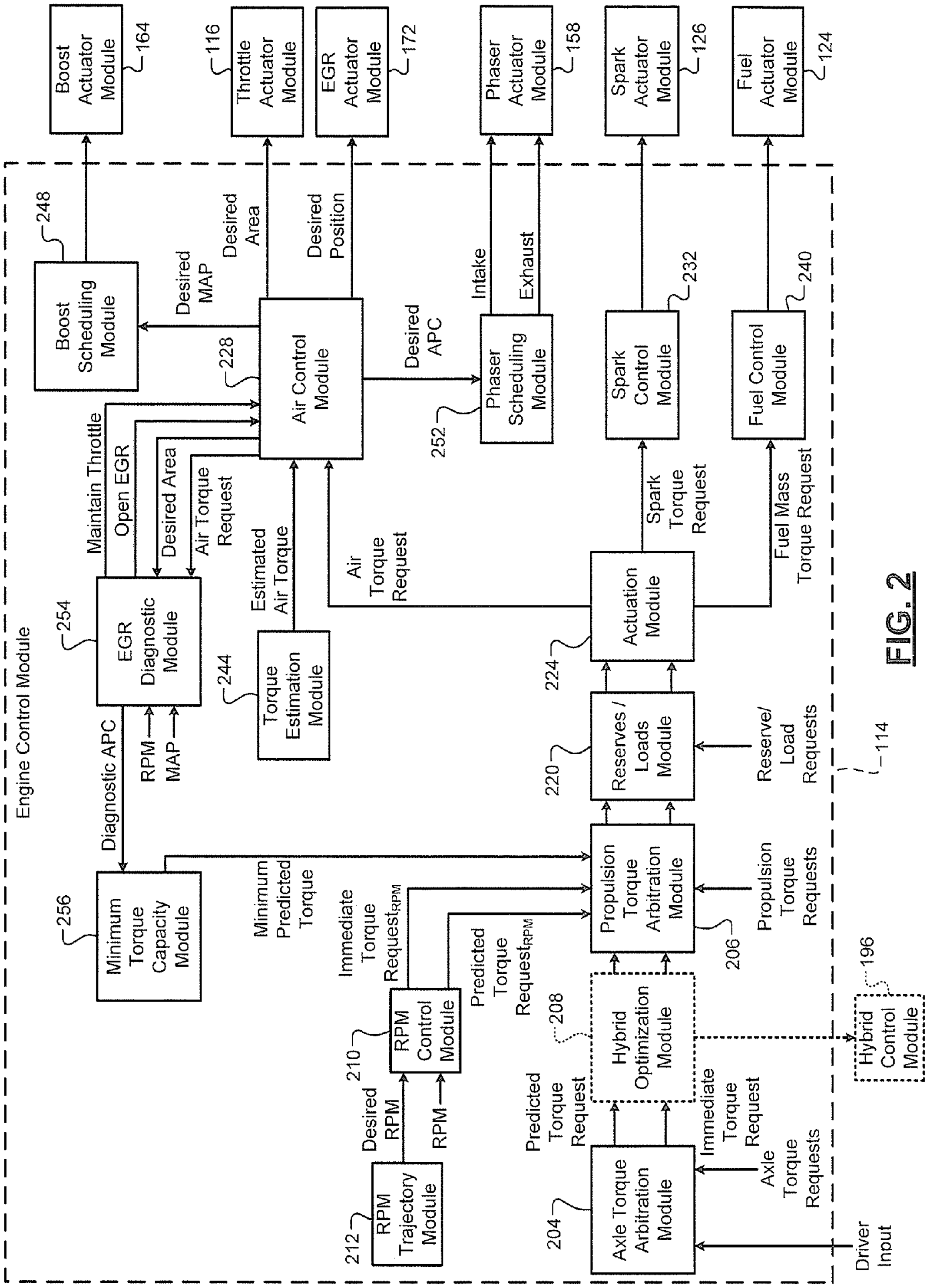
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes an axle torque arbitration module 204. The axle torque arbitration module 204 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 204 outputs a predicted torque request and an immediate torque request based on the results of arbitrating between the received torque requests. The predicted torque request is the amount of torque that the ECM 114 prepares the engine 102 to generate, and may often be based on the driver's torque request. The immediate torque request is the amount of currently desired torque, which may be less than the predicted torque request.

The immediate torque request may be less than the predicted torque request to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque request may be achieved by varying engine actuators that respond quickly, while slower engine actuators may be used to prepare for the predicted torque request. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 204 may output the predicted torque request and the immediate torque request to a propulsion torque arbitration module 206. In various implementations, the axle torque arbitration module 204 may output the predicted torque request and immediate torque request to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 may generate an arbitrated predicted torque request and an arbitrated immediate torque request. The arbitrated torque requests may be generated by selecting a winning request from among received requests. Alternatively or additionally, the arbitrated torque requests may be generated by modifying one of the received requests based on another one or more of the received requests.

Other propulsion torque requests may include torque reductions for engine over-speed protection, torque increases for stall prevention, and torque reductions to accommodate transmission gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque request outputted by the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve by increasing the predicted torque request.

For example only, a catalyst light-off process or a cold start emissions reduction process may require retarded spark advance. The reserves/loads module 220 may therefore increase the predicted torque request above the immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create a reserve in anticipation of a future load, such as the engagement of the air conditioning compressor clutch or power steering pump operation. The reserve for air conditioning (A/C) clutch engagement may be created when the driver first requests air conditioning. Then, when the A/C clutch engages, the reserves/loads module 220 may add the expected load of the A/C clutch to the immediate torque request.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, desired air per cylinder (APC) and/or desired EGR position. Desired MAP may be used to determine desired boost, and desired APC may be used to determine desired cam phaser positions.

In gas systems, the actuation module 224 may also generate a spark torque request and a fuel mass torque request. The spark torque request may be used by a spark control module 232 to determine how much to retard the spark (which reduces the engine torque output) from a calibrated spark advance.

The fuel mass torque request may be used by a fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

A torque estimation module 244 may estimate torque output of the engine 102. This estimated torque may be used by the air control module 228 to perform closed-loop control of engine air flow parameters, such as throttle area, EGR position, MAP, and phaser positions. For example only, a torque relationship such as $$T=f(\mathrm{APC},S,I,E,\mathrm{AF},\mathrm{OT},\mathrm{EGR}) \tag{1}$$

may be defined, where torque (T) is a function of air per cylinder (APC), spark advance (S), intake cam phaser position (I), exhaust cam phaser position (E), air/fuel ratio (AF), oil temperature (OT), and EGR position (EGR).

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value).

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may generate a desired position signal, which is output to the EGR actuator module 172. The EGR actuator module 172 then regulates the EGR valve 170 to produce the desired EGR position. The air control module 228 may generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},\mathrm{APC},I,E,\mathrm{AF},\mathrm{OT},\mathrm{EGR}) \qquad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

An EGR diagnostic module 254 and a minimum torque capacity module 256 may implement EGR diagnostic techniques of the present disclosure. The EGR diagnostic module 254 may generate a maintain throttle signal that is output to the air control module 228 when the ECM 114 is in a coastdown mode. The air control module 228 then maintains a desired throttle area. The coastdown mode may be selected when the driver removes their foot from the accelerator pedal, the vehicle is moving, and the transmission is driving the engine (i.e., the transmission is in-gear). The EGR diagnostic module 254 may determine whether the ECM 114 is in a coastdown mode based on the air torque request and the crankshaft speed in revolutions per minute (RPM).

The EGR diagnostic module 254 may generate an open EGR signal that is output to the air control module 228 when the desired throttle area is maintained. The air control module 228 then adjusts an EGR position toward open. This ensures that the APC is not adjusted when the EGR position is adjusted as a result of the air control module 228 using the EGR position during closed-loop control of engine air flow parameters. The EGR diagnostic module 254 may receive a MAP signal and diagnose an EGR system error when an intake manifold pressure increase is less than a minimum pressure increase.

The air control module 228 may output the desired area signal and the air torque request signal to the EGR diagnostic module 254. The EGR diagnostic module 254 may refrain from maintaining the desired throttle area when the desired throttle area is greater than a maximum throttle area. The EGR diagnostic module 254 may refrain from maintaining the desired throttle area when an air torque request that corresponds to the desired throttle area is greater than a secure torque request. The maximum throttle area and the secure torque request may be calibratable thresholds that improve torque security. Torque security may be improved by preventing maintenance of the desired torque area when a driver requests torque, which may cause torque output to exceed the driver's intent when the driver ceases to request torque.

The EGR diagnostic module 254 may generate a diagnostic APC signal that is output to the minimum torque capacity module 256. The minimum torque capacity module 256 then generates a minimum predicted torque signal based on the diagnostic APC signal and outputs the minimum predicted torque signal to the propulsion torque arbitration module 206. In this manner, the EGR diagnostic module 254 may increase a minimum predicted torque to increase the desired throttle area before adjusting the EGR position, which ensures that a minimum flow of unburned air per cylinder is maintained.

The spark control module 232 may reduce the spark advance to achieve the driver's torque request when the ECM 114 is in the coastdown mode and the desired throttle area is increased. The spark control module 232 may reduce the spark advance based on an inverse torque model, the driver's torque request, an APC that corresponds to the increased desired throttle area, and the EGR position.

The EGR diagnostic module 254 may maintain the desired MAP and the desired APC when adjusting the EGR position rather than maintaining the desired throttle area. The desired throttle area may be determined based on the desired MAP, the desired APC, and a measured RPM (i.e., measured speed of the crankshaft in revolutions per minute). Thus, the desired throttle area may be adjusted based on the measured RPM when the desired MAP and the desired APC are maintained and the EGR position is adjusted.

Figure 3:
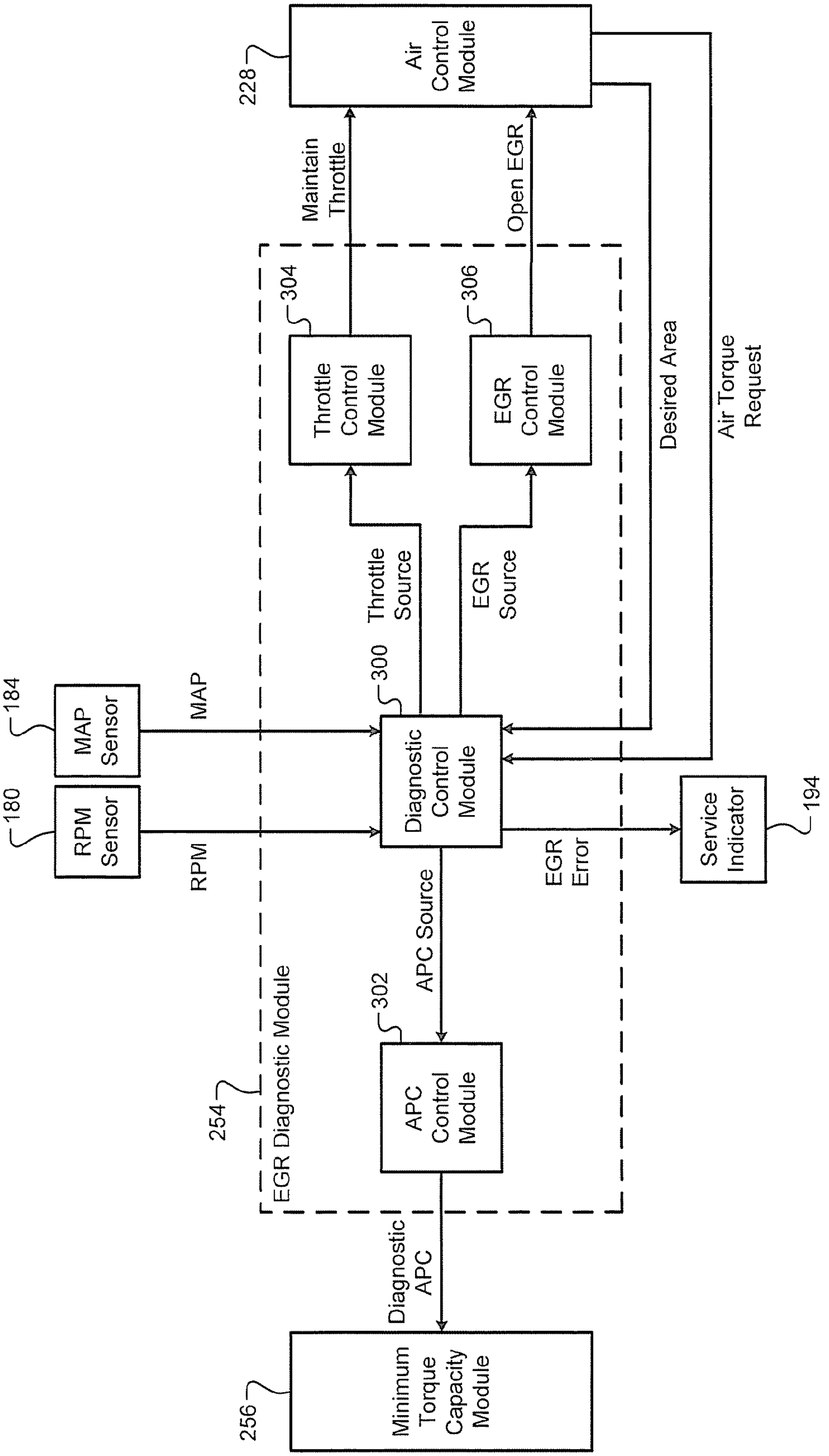
FIG. 3 is a functional block diagram of an exemplary control module according to the principles of the present disclosure.

Referring now to FIG. 3, the EGR diagnostic module 254 may include a diagnostic control module 300, an APC control module 302, a throttle control module 304, and an EGR control module 306. The diagnostic control module 300 receives a crankshaft speed from the RPM sensor 180 and receives an intake manifold pressure from the MAP sensor 184. The diagnostic control module 300 receives the desired area and the air torque request from the air control module 228.

The diagnostic control module 300 determines whether a coastdown mode is selected based on the crankshaft speed and/or the air torque request. For example, the diagnostic control module 300 may determine that the coastdown mode is selected when the crankshaft speed is greater than an idle speed and when the air torque request is less than a maximum torque request.

The diagnostic control module 300 may generate an APC source signal that is output to the APC control module 302 when the coastdown mode is selected. The APC source signal indicates that the EGR diagnostic module 254 may control the minimum APC. The APC control module 302 then generates a diagnostic APC signal that is output to the minimum torque capacity module 256. The diagnostic APC signal indicates a diagnostic APC that yields a minimum air flow for EGR diagnostic testing. The minimum torque capacity module 256 then determines the minimum APC based on the diagnostic APC and generates the minimum predicted torque signal based on the minimum APC.

The APC control module 302 may store a predetermined value for the diagnostic APC and/or determine the diagnostic APC based on a desired amount of opening of the EGR valve 170. The minimum torque capacity module 256 may increase the minimum APC based on the diagnostic APC. In turn, the air control module 228 may determine the desired throttle area based on the increased minimum APC before maintaining the desired throttle area. This prevents a misfire that may occur when the EGR valve 170 is opened while the desired throttle area is maintained, causing exhaust flow to increase and unburned air flow to decrease.

The diagnostic control module 300 may generate a throttle source signal that is output to the throttle control module 304 when the minimum APC is determined based on the diagnostic APC signal. The throttle source signal indicates that the EGR diagnostic module 254 may control the desired area. The throttle control module 304 then generates a maintain throttle signal that is output to the air control module 228. The air control module 228 then maintains the desired throttle area. The air control module 228 may determine the desired throttle area based on a minimum throttle area that provides a minimum APC to each cylinder when the coastdown mode is selected. For example, the desired throttle area may be equal to the minimum throttle area.

The diagnostic control module 304 may refrain from generating the throttle source signal and/or stop generating the throttle source signal based on the desired area and/or the air torque request. The throttle control module 304 refrains from maintaining the desired throttle area when the diagnostic control module 304 refrains from generating the throttle source signal. Similarly, the throttle control module 304 stops maintaining the desired throttle area when the diagnostic control module 304 stops generating the throttle source signal.

The throttle control module 304 may refrain from maintaining the desired throttle area when the desired throttle area is greater than a maximum throttle area. The throttle control module 304 may refrain from maintaining the desired throttle area when an air torque request that corresponds to the desired throttle area is greater than a secure torque request. The maximum throttle area and the secure torque request may be calibratable thresholds that improve torque security. Torque security may be improved by preventing maintenance of the desired torque area when a driver requests torque, which may cause torque output to exceed the driver's intent when the driver ceases to request torque.

The throttle control module 304 may allow adjustment of the desired throttle area when an accelerator pedal position indicates that acceleration is requested, thereby improving drivability. The throttle control module 304 may allow adjustment of the desired throttle area when the air torque request is greater than a maximum torque request, which may be a calibratable threshold that improves drivability. Drivability may be improved by ensuring that the engine responds with a normal delay (e.g., response time of slow actuators).

The diagnostic control module 300 may generate an EGR source signal that is output to the EGR control module 306 when the desired throttle area is maintained. The EGR source signal indicates that the EGR diagnostic module 254 may control the EGR valve 170. The EGR control module 306 then generates an open EGR signal that is output to the air control module 228. The open EGR signal indicates the desired amount of opening of the EGR valve 170 and is output to the EGR control module 306. The air control module 228 then controls the EGR actuator module 172 to open the EGR valve 170 based on the desired amount of opening.

The diagnostic control module 300 may diagnose an error of the EGR system based on the intake manifold pressure when the EGR valve 170 is open. The diagnostic control module 300 diagnoses the error of the EGR system when an increase in the intake manifold pressure is less than a minimum pressure increase. The diagnostic control module 300 may activate the service indicator 194 when the error of the EGR system is diagnosed.

The diagnostic control module 300 may monitor the increase in the intake manifold pressure during a diagnostic period. The diagnostic period may be short (e.g., less than a second). The diagnostic control module 300 may monitor the intake manifold pressure, the crankshaft speed, and the desired throttle area during a stabilization period before initiating the diagnostic period. The diagnostic control module 300 may stop generation of the maintain throttle and open EGR signals when the diagnostic period has elapsed. The APC and the EGR position may then be returned to non-diagnostic control.

Figure 4:
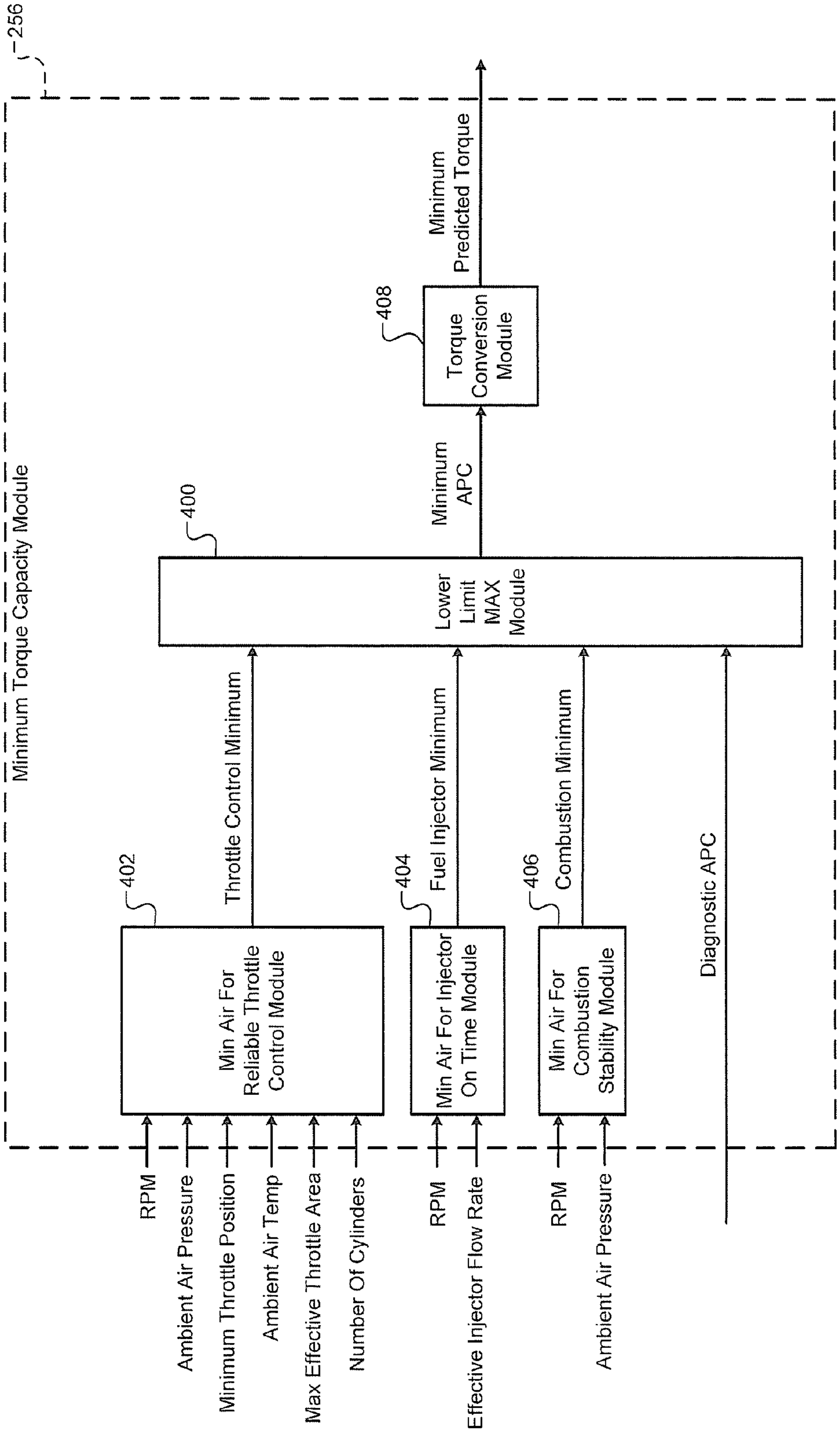
FIG. 4 is a functional block diagram of an exemplary control module according to the principles of the present disclosure.

Referring now to FIG. 4, a functional block diagram of an exemplary implementation of the engine torque control module of FIG. 4 is shown. The minimum torque capacity module 256 determines the minimum APC that is achievable. For example, the minimum APC may be based on one or more of minimum controllable throttle position, minimum consistent fuel injector on time, minimum air density for self-sustaining combustion, and minimum air flow for EGR diagnostic testing. A lower limit max module 400 determines a lower limit of achievable APC based on, for example only, whichever of the minimum controllable throttle position, the minimum consistent fuel injector on time, the minimum air density for self-sustaining combustion, and the minimum air flow for EGR diagnostic testing that corresponds to a greater minimum APC.

The minimum APC required to maintain a controllable throttle position can be determined by a minimum air for reliable throttle control module 402. The minimum air for reliable throttle control module 402 may calculate the minimum air based on several inputs. For example, a first input may include a rotating engine speed in RPM. A second input may include barometric pressure, which may be referred to as ambient air pressure, and may be low-pass filtered.

A third input may be the minimum throttle position as a percentage of maximum position, i.e., wide-open throttle (WOT). Completely closing the throttle may cause the throttle to become mechanically stuck in the throttle bore. A minimum throttle position calibration may therefore limit how completely closed the throttle may be. A fourth input may include the temperature of the air outside of the vehicle (i.e., ambient air). This temperature may be estimated from a fuel system temperature sensor operating under certain conditions instead of being read from a dedicated sensor.

A fifth input may include the maximum effective area of the throttle bore, in millimeters squared, when the throttle is wide open. This effective area may be a geometric measurement or may be inferred from an air flow measurement test that incorporates the throttle body discharge coefficient. A sixth input may include the number of cylinders in the engine, which may come from a calibration. Alternatively, the number of cylinders may change as selected cylinders are deactivated.

The fuel injectors may introduce another limit as a result of not being able to open and close instantaneously. The fuel injectors may have a minimum on time for which they must be driven. Without the minimum on time, the fuel injectors may effectively stay closed or may open to an indeterminable position. The minimum on time creates a minimum amount of fuel that can be reliably delivered into the cylinder. Since gasoline engines are typically run at a fixed air/fuel ratio, this minimum possible fuel delivered limit in turn creates a minimum APC limit.

Minimum air dictated by minimum injector on time can be determined by a minimum air for injector on time module 404. The minimum air for injector on time module 404 can perform its calculation based on engine RPM and the current effective injector flow rate in milligrams/second. The current effective injector flow rate may be a function of the pressure across the injector and the orifice size.

Another APC limit may result from the requirement of stable combustion. If fuel droplets are too widely spaced in the combustion chamber, there may not be enough heat transferred from the burning of one molecule to its neighbors to get self-sustaining combustion. In such a case, combustion starts at the spark plug but fails to ignite all the other droplets in the combustion chamber. The unburned fuel droplets then go out the exhaust port, and may damage the catalyst.

This limit is typically observed by calibrators using combustion quality measuring equipment as a wide variance in indicated mean effective pressure, which can be transformed into a coefficient of variance number, or COV. This limit may also be observed by monitoring the catalyst temperature in engines with catalyst temperature sensors. Catalyst temperatures start climbing when unburned fuel droplets reach the catalyst.

Minimum air required for acceptable combustion stability can be determined by a minimum air for combustion stability module 406. The minimum air for combustion stability module 406 can perform its calculation based on engine RPM and ambient air pressure.

The EGR diagnostic module 254 provides the diagnostic APC for EGR diagnostic testing to the minimum torque capacity module 256 via the diagnostic APC signal. The minimum torque capacity module 256 may increase the minimum APC by the diagnostic APC. In turn, the air control module 228 may increase the desired throttle area before adjusting the EGR position to ensure that a minimum flow of unburned air per cylinder is maintained.

The maximum of the potential minimum APC limits is determined by the lower limit max module 400. The lower limit max module 400 increases this maximum based on the diagnostic APC. The lower limit max module 400 outputs the increased minimum APC to a torque conversion module 408. The torque conversion module 408 converts the minimum APC to the minimum predicted torque. The torque conversion module 408 outputs the minimum predicted torque to the propulsion torque arbitration module 206.

Figure 5:
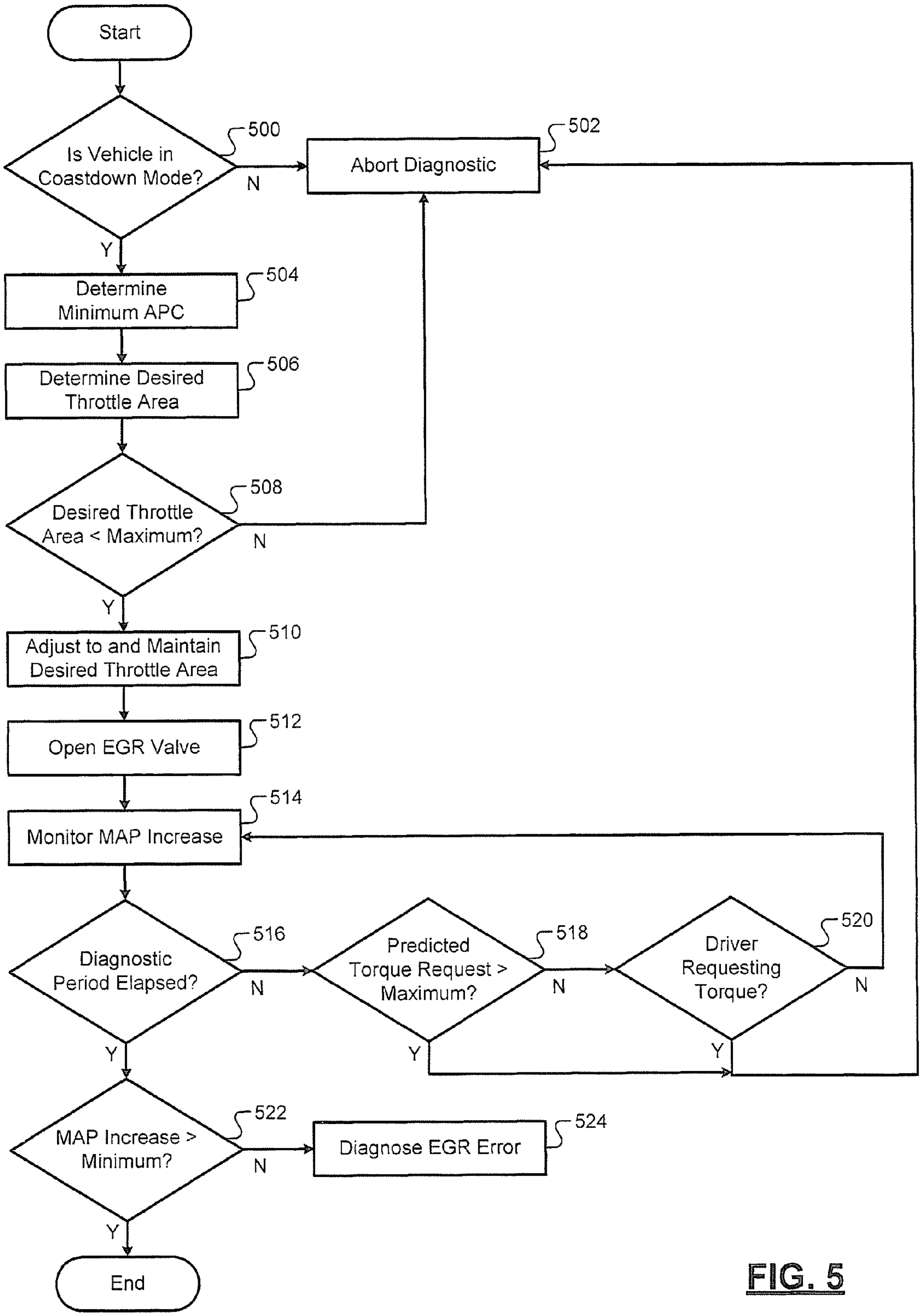
FIG. 5 illustrates exemplary steps of an exhaust gas recirculation control method according to the principles of the present disclosure.

Referring now to FIG. 5, control determines whether a vehicle is in a coastdown mode (e.g., vehicle moving, driver off pedal, and transmission driving engine) in step 500. Control may determine whether the vehicle is in the coastdown mode based on a crankshaft speed and/or an accelerator pedal position. For example, control may determine that the vehicle is in the coastdown mode when the crankshaft speed is greater than an idle speed and when the accelerator pedal position indicates that acceleration is not requested.

Control aborts the EGR diagnostic method in step 502 when the vehicle is not in the coastdown mode. Control determines a minimum air per cylinder (APC) in step 504 when the vehicle is in the coastdown mode. Control may determine the minimum APC based on one or more of a minimum controllable throttle position, a minimum consistent fuel injector on time, a minimum air density for self-sustaining combustion, and a minimum air flow for EGR diagnostic testing.

Control may determine the minimum APC based on a maximum of potential minimum APC values determined based on the minimum controllable throttle position, the minimum consistent fuel injector on time, the minimum air density for self-sustaining combustion, and the minimum air flow for EGR diagnostic testing. Control may determine a diagnostic APC based on a desired amount of opening of an EGR valve and increase the minimum APC based on the diagnostic APC.

Control determines a desired throttle area based on a minimum throttle area that provides the minimum APC to each cylinder in step 506. Control may set the desired throttle area equal to the minimum throttle area. Control determines whether the desired throttle area is less than a maximum throttle area in step 508.

Control aborts the EGR diagnostic method in step 502 when the desired throttle area is greater than or equal to the maximum throttle area. Control adjusts a measured throttle area to the desired throttle area in step 510 when the desired throttle area is less than the maximum throttle area. Control then maintains the measured throttle area at the desired throttle area in step 510.

Control opens the EGR valve based on the desired amount of opening of the EGR valve in step 512. Control monitors an intake manifold air pressure (MAP) increase in step 514. Control determines whether a diagnostic period has elapsed in step 516.

Control determines whether a predicted torque request is greater than a maximum torque request in step 518 when the diagnostic period has not elapsed. The predicted torque request may be used to control air flow to an intake manifold, and the maximum torque request may be predetermined. Control proceeds to step 520 when the predicted torque request is less than or equal to the maximum torque request. Control aborts the EGR diagnostic method in step 502 when the predicted torque request is greater than the maximum torque request. Aborting the EGR diagnostic method allows adjustment of a throttle and the EGR valve based on non-diagnostic control.

In step 520, control determines whether a driver is requesting torque (e.g., driver tipping into accelerator). Control aborts the EGR diagnostic method in step 502 when the driver requests torque. Control continues to monitor the MAP increase in step 514 when the driver does not request torque.

Control determines whether the MAP increase is greater than a minimum pressure increase in step 522 when the diagnostic period has elapsed. Control diagnoses an error of an EGR system in step 524 when the MAP increase is less than or equal to a minimum MAP increase. Control may activate a service indicator when the error of the EGR system is diagnosed.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:

a throttle control module that selectively maintains a throttle valve at a desired throttle area when a vehicle is in a coastdown mode, wherein maintaining the throttle valve at the desired throttle area does not fully close the throttle valve;

an exhaust gas recirculation (EGR) control module that opens an EGR valve when the throttle valve is maintained at the desired throttle area; and a diagnostic control module that selectively diagnoses an error of an EGR system based on a pressure increase measured in an intake manifold of an engine when the EGR valve is open.

2. The control system of claim 1, wherein the diagnostic control module diagnoses the error of the EGR system when the measured pressure increase is less than a minimum pressure increase.

3. The control system of claim 2, wherein the throttle control module refrains from maintaining the throttle valve at the desired throttle area when the desired throttle area is greater than a maximum throttle area.

4. The control system of claim 2, wherein an air torque request is used to control air flow to one or more cylinders in the engine, and wherein the throttle control module stops maintaining the throttle valve at the desired throttle area when the air torque request is greater than a maximum torque request.

5. The control system of claim 2, wherein the throttle control module stops maintaining the throttle valve at the desired throttle area when an accelerator pedal position indicates that acceleration is requested.

6. The control system of claim 2, further comprising an air control module that determines the desired throttle area based on a minimum throttle area that provides a minimum air per cylinder (APC) to a cylinder of the engine.

7. The control system of claim 6, further comprising a minimum torque capacity module that determines the minimum APC based on at least one of a minimum controllable throttle position, a minimum consistent fuel injector on time, a minimum air density for self-sustaining combustion, and a minimum air flow for EGR diagnostic testing.

8. The control system of claim 7, further comprising an APC control module that determines a diagnostic APC based on the amount of opening of the EGR valve.

9. The control system of claim 8, wherein the minimum torque capacity module increases the minimum APC based on the diagnostic APC.

10. The control system of claim 9, wherein, before the throttle control module maintains the throttle valve at the desired throttle area, the air control module determines the desired throttle area based on the increased minimum APC.

11. A method, comprising:

selectively maintaining a throttle valve at a desired throttle area when a vehicle is in a coastdown mode, wherein maintaining the throttle valve at the desired throttle area does not fully close the throttle valve;

opening an EGR valve when the throttle valve is maintained at the desired throttle area; and selectively diagnosing an error of an EGR system based on a pressure increase measured in an intake manifold of an engine when the EGR valve is open.

12. The method of claim 11, further comprising diagnosing the error of the EGR system when the measured pressure increase is less than a minimum pressure increase.

13. The method of claim 12, further comprising refraining from maintaining the throttle valve at the desired throttle area when the desired throttle area is greater than a maximum throttle area.

14. The method of claim 12, further comprising:

using an air torque request to control air flow to one or more cylinders in the engine; and stop maintaining the throttle valve at the desired throttle area when the air torque request is greater than a maximum torque request.

15. The method of claim 12, further comprising stop maintaining the throttle valve at the desired throttle area when an accelerator pedal position indicates that acceleration is requested.

16. The method of claim 12, further comprising determining the desired throttle area based on a minimum throttle area that provides a minimum air per cylinder (APC) to a cylinder of the engine.

17. The method of claim 16, further comprising determining the minimum APC based on at least one of a minimum controllable throttle position, a minimum consistent fuel injector on time, a minimum air density for self-sustaining combustion, and a minimum air flow for EGR diagnostic testing.

18. The method of claim 16, further comprising determining a diagnostic APC based on the amount of opening of the EGR valve.

19. The method of claim 18, further comprising increasing the minimum APC based on the diagnostic APC.

20. The method of claim 19, further comprising determining the desired throttle area based on the increased minimum APC before maintaining the throttle valve at the desired throttle area.

* * * * *